(12) United States Patent
Anderson et al.

(10) Patent No.: US 8,758,503 B2
(45) Date of Patent: Jun. 24, 2014

(54) PROCESSED MINERAL ADDITIVE FOR REDUCING CONCRETE PERMEABILITY AND INCREASING STRENGTH

(71) Applicants: Terry L. Anderson, Santa Rosa Beach, FL (US); Neal S. Berke, Portage, MI (US)

(72) Inventors: Terry L. Anderson, Santa Rosa Beach, FL (US); Neal S. Berke, Portage, MI (US)

(73) Assignee: CenterStar, Inc., Santa Rosa Beach, FL (US)

( * ) Notice: Subject to any disclaimer, the term of this patent is extended or adjusted under 35 U.S.C. 154(b) by 0 days.

(21) Appl. No.: 13/987,975

(22) Filed: Sep. 20, 2013

(65) Prior Publication Data

US 2014/0020602 A1  Jan. 23, 2014

Related U.S. Application Data

(63) Continuation-in-part of application No. 13/374,935, filed on Jan. 24, 2012, now Pat. No. 8,568,527.

(51) Int. Cl.
*C04B 14/18* (2006.01)

(52) U.S. Cl.
USPC .................................... 106/706; 106/DIG. 2

(58) Field of Classification Search
CPC .................................................. C04B 14/185
USPC ............................................ 106/706, DIG. 2
See application file for complete search history.

(56) References Cited

U.S. PATENT DOCUMENTS

| | | | |
|---|---|---|---|
| 2,853,394 A | 9/1958 | Riddell et al. | |
| 4,210,457 A | 7/1980 | Dodson et al. | |
| 4,462,835 A * | 7/1984 | Car | 106/602 |
| 4,963,191 A | 10/1990 | LaFleur | |
| 5,002,696 A * | 3/1991 | White | 252/378 R |
| 5,114,617 A * | 5/1992 | Smetana et al. | 252/378 P |
| 5,174,819 A | 12/1992 | Carlson | |
| 5,294,255 A | 3/1994 | Smetana et al. | |
| 5,356,446 A | 10/1994 | Smetana et al. | |
| 6,290,769 B1 | 9/2001 | Carkner | |
| 6,402,830 B1 | 6/2002 | Schaffer | |
| 7,736,431 B2 | 6/2010 | Bui | |
| 7,748,453 B2 | 7/2010 | Reddy | |
| 2009/0011207 A1 | 1/2009 | Dubey | |
| 2011/0100626 A1 | 5/2011 | Brenneis et al. | |
| 2011/0155019 A1 | 6/2011 | Albright et al. | |

* cited by examiner

*Primary Examiner* — Paul Marcantoni
(74) *Attorney, Agent, or Firm* — Robert J. Lauf

(57) ABSTRACT

A concrete additive includes expanded perlite with a volume weighted mean particle size of approximately 10-100 μm. The perlite further includes at least one additional component to improve workability and compensate for the natural tendency of expanded perlite to absorb water from the concrete mix. The additional component can include: water; a superplasticizer such as polycarboxylates, naphthalene sulfonate, and melamine sulfonate; or a hydrophobic compound such as salts of fatty acids, fatty acids, silanes, and siloxanes. The additive can be made in the form of a flowable powder or a flowable slurry. Concrete containing this additive displays superior properties to conventional concrete, including extremely high thermal resistance and high strength, low chloride ion permeability, and good early strength. The expanded perlite is a readily available raw material and the finished concrete is extremely cost effective for applications where a high strength structural concrete must withstand high temperatures.

12 Claims, 2 Drawing Sheets

PROCESSED MINERAL ADDITIVE FOR REDUCING CONCRETE PERMEABILITY AND INCREASING STRENGTH

CROSS-REFERENCE TO RELATED APPLICATION

This application is a continuation-in-part of U.S. patent application Ser. No. 13/374,932, filed on Jan. 24, 2012, which in turn claims the benefit of Provisional Patent Application No. 61/438,276 filed on Feb. 1, 2011 by the present inventors, the entire disclosures of which are incorporated herein by reference.

BACKGROUND OF THE INVENTION

1. Field of the Invention

The invention pertains to materials and methods for making heat resistant concrete, and more particularly for a spall-resistant and/or heat resistant concrete. The invention also relates to materials and methods for making high strength concrete.

2. Description of Related Art

In the 1990s, fires in concrete-lined tunnels created a situation of rapidly rising temperature. This rapid rise in temperature led to explosive spalling of large areas of concrete. Large falling concrete chunks proved to be almost as dangerous to trapped motorists as the smoke and fumes from the fires. More recently, the increased heat of vertical take-off and landing aircraft (F-35 and Osprey) have caused great concern that explosive spalling might endanger both crew and aircraft. The process of heat-induced spalling is relatively simple. When concrete is exposed to temperatures above the boiling point of water, moisture in the concrete turns to steam. If the temperature rises more rapidly than the steam can escape, rising pressure causes the concrete to spall. The heat from jet exhaust or vehicle fires is typically much greater (in the range of 1700 to 2000° F.) causing potentially explosive spalling.

Accordingly, there is a need for concrete having improved spalling resistance. There is also a need for concrete having improved compressive and flexural strength, as these properties control how much concrete must be used to support a given design load. Furthermore, given the present interest in reducing the carbon footprint of various manufacturing processes, there is a need for concrete formulations that reduce the production of carbon dioxide during cement making.

Modern concrete mixes typically contain various additives in addition to cement, water, and aggregate. Some familiar additives include ground blast furnace slag, coal ash, and expanded perlite. Expanded perlite is typically used as an additive primarily in lightweight applications to provide thermal barriers for fire protection. The perlite materials that are used are typically quite coarse and added in fairly large quantities. Water-to-cementitious contents are typically above 0.6 by mass and in most cases the material is being used as one of the fine aggregates. Coarse aggregates, as are normal in structural concrete, are not usually present. Some examples of concrete formulations include the following:

U.S. Pat. No. 7,748,453 to Reddy discloses a method of making a wellbore fluid comprising a cement composition that contains cement, ground expanded perlite at 1-100 percent and 2-400 μm size, and water.

U.S. 2011/0100626 to Brenneis et al. discloses a method of making a settable wellbore fluid composition containing ground unexpanded perlite of 1-100 μm size and 1-75 percent composition; additional components include fly ash, slag cement, metakaolin, and fumed silica.

U.S. Pat. No. 5,114,617 to Smetana et al. discloses a concrete composition that contains 8-65 percent cement, 0.5-20 percent smooth surfaced expanded perlite, less than 0.15-0.6 mm, and may contain fly ash.

U.S. 2009/0011207 to Dubey discloses a lightweight cementitious slurry of 35-60 percent Portland cement, 2-10 percent expanded, chemically coated perlite and at least one of silica fume, metakaolin, blast furnace slag, fly ash as mineral additive; fly ash can be 10-60 percent.

U.S. 2011/0155019 to Albright et al. discloses a cement blend with Portland cement, 0.1-7 percent perlite, 0.1-40 percent fly ash.

U.S. Pat. No. 5,294,255 to Smetana et al. discloses a grout composition with expanded perlite, Portland cement, and fly ash.

U.S. Pat. No. 7,736,431 to Bui discloses a lightweight concrete mix with expanded perlite in the 1-2.5 mm size range.

U.S. Pat. No. 6,402,830 to Schaffer discloses a lightweight concrete composition with pumice and 1-4 percent expanded perlite at minus 3/16 inch to dust in size.

U.S. Pat. No. 5,356,446 to Smetana et al. discloses a cementitious compound with expanded perlite at 100-30 mesh and 10-20 percent.

U.S. Pat. No. 4,963,191 to LaFleur discloses a cementitious composition with Portland cement and expanded perlite.

U.S. Pat. No. 4,210,457 to Dodson et al. discloses a fly ash and Portland cement mixture with expanded perlite.

U.S. Pat. No. 2,853,394 to Riddell et al. discloses that expanded perlite is 300 μm size and 1-3 percent of admixture.

U.S. Pat. No. 7,748,453 to Reddy et al. discloses the use of perlite additive in fairly large amounts for use in flowing non segregating grouts.

U.S. 2011/0155019 to Albright et al. discloses the use of perlite additive. Silica fume is required as are hollow microspheres and titanium oxide. High temperature resistance and strength enhancement are reported benefits. The disclosure includes an OC blend of fused silica, micro-beads, ground expanded perlite, fumed silica, and class C fly ash used with cement and additional C fly ash, ground expanded perlite, and aggregates for a moderate weight concrete for fire performance. High temperature concrete used OC formulation which has a large amount of additional additives including vinyl acrylic copolymer, acrylic latex, and $TiO_2$.

OBJECTS AND ADVANTAGES

Objects of the present invention include the following: providing a structural concrete with improved heat resistance; providing a structural concrete with improved spalling resistance; providing a structural concrete with improved strength; providing a structural concrete with improved resistance to chloride ion penetration; providing a free-flowing concrete additive that is easy to use; providing a concrete additive that contains expanded perlite in an easily blendable form; and providing a concrete additive that improves the strength, heat and spalling resistance, and resistance to chloride ion penetration of structural concrete. These and other objects and advantages of the invention will become apparent from consideration of the following specification, read in conjunction with the drawings.

SUMMARY OF THE INVENTION

According to one aspect of the invention, a concrete additive comprises:

a flowable powder comprising expanded perlite with a volume weighted mean particle size of approximately 10-100 μm and a moisture content of 10 to 50% by weight.

According to another aspect of the invention, a concrete additive comprises:

a flowable powder comprising expanded perlite with a volume weighted mean particle size of approximately 10-100 μm, and, a hydrophobic compound applied to at least part of the accessible surface area of the expanded perlite.

According to another aspect of the invention, a concrete additive comprises:

a flowable powder comprising expanded perlite with a volume weighted mean particle size of approximately 10-100 μm, and, at least one additional component selected from the group consisting of:

water in an amount of 10 to 50% by weight;
superlasticizer in an amount of about 0.025 to 0.8% on a solids basis; and,
a hydrophobic compound applied to at least part of the accessible surface area of the expanded perlite.

According to another aspect of the invention, a concrete additive comprises:

a flowable slurry comprising expanded perlite with a volume weighted mean particle size of approximately 10-100 μm and a water content of at least five times that of the perlite by weight.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
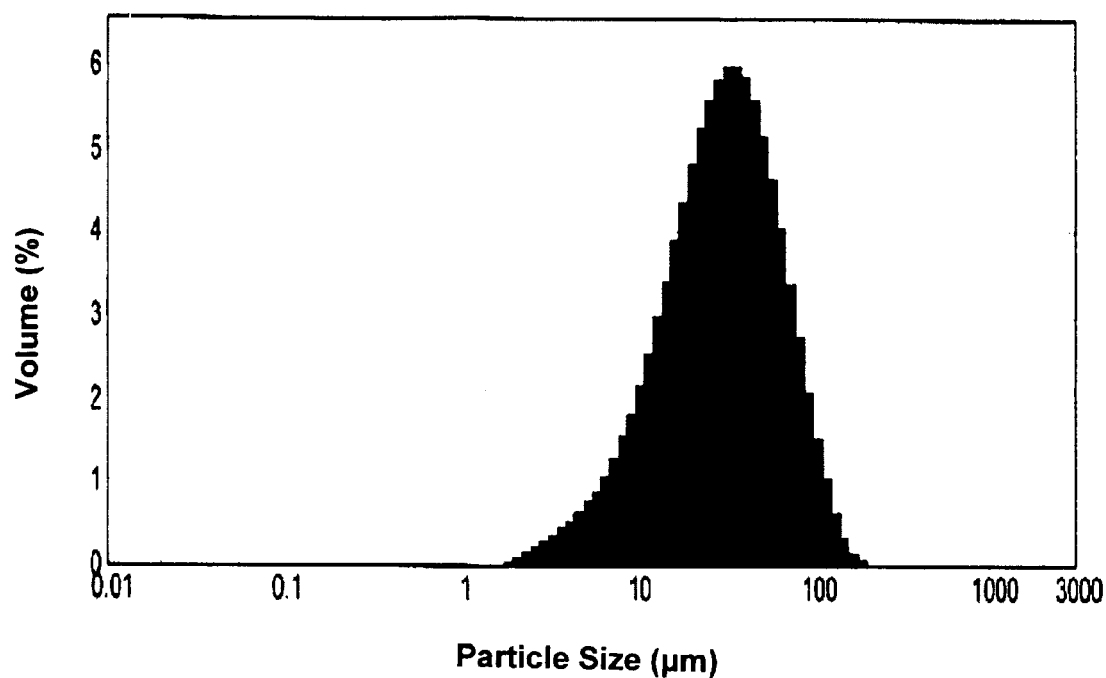
FIG. 1 is a plot of the particle size distribution of a ground, expanded perlite suitable for use in the invention.

This invention comprises a novel use of ground expanded perlite as a pozzolan in structural concrete and mortar. Previous uses of perlite have generally been in coarser form to act as a lightweight aggregate, although ground perlite is disclosed in some of the applications discussed above for oil well applications and a high temperature product with silica fume and hollow spheres. Expanded perlite is a type of perlite that has been heated to temperatures typically in the range of 1650 to 1900° F., at which point the glassy material softens. Residual moisture vaporizes, expanding the softened glass to 7-15 times its original volume. The expanded material is typically bright white because of the reflectivity of the trapped gas bubbles. Unexpanded (raw) perlite has a specific gravity of 2.2 to 2.4. Expanded perlite has a volume density on the order of 2 pounds per cubic foot.

The invention addresses three key issues facing the structural concrete and mortar industry. These are the reduction of greenhouse gases, improving the durability of concrete and mortar, and doing so without adverse effects on strength. In addition, the material used in this invention is readily available and does not darken concrete as is the case with silica fume and some fly ashes.

The invention reduces greenhouse gases by substituting for cement. The manufacture of the inventive material requires less heat than is used in cement production and in addition does not release additional carbon dioxide from the conversion of limestone to Portland cement. In addition, strength is increased so overall cement levels can be decreased more, either by using less cement to meet strength requirements, or less concrete is needed at higher strength levels.

Durability is improved with a large unexpected decrease in permeability at relatively low doses for a material at this particle size. Dosage rates are under 10% cement replacement, whereas fly ash or ground granulated blast furnace slags need to be used from 15% and typically 25% or more for fly ash and 40% or more for slag to achieve permeabilities comparable to what is achieved with the invention, as will be shown in the examples that follow.

Unlike fly ash or slag there is not an early strength trade off and the product has one-day strengths equivalent to better than silica fume and maintains these strength advantages to at least 90 days of curing.

The invention is a method of reducing the Portland cement content in a mortar or concrete without reducing initial strength and increasing long term strength and reducing long-term and early permeability by use of the addition of ground expanded perlite as a cement replacement (CenterStar). According to one preferred example, the size characteristics are 100% of the particles less than 200 μm, 90% below 80 μm, with a volume weighted mean of approximately 38 μm. It will be appreciated that the mean particle size can be varied over some range without departing from the spirit of the invention. This range may vary with particular intended applications as well as with the particular grinding processes and specifications of perlite manufacturers and may range from 10 to 100 μm. This is in contrast to fly ash and ground granulated blast furnace slags that significantly lower the early strength development. The higher early strength is a benefit for removal of formwork and speed of construction operations. The higher long-term strength is useful for design allowing less concrete to be used to meet a given structural requirement, or less total cement to meet the requirements. Advantages include both saving materials cost and reducing the amount of greenhouse gases associated with the concrete or mortar.

In addition, the CenterStar additive provides high early and late day strengths without darkening the concrete, providing a significant plus for higher performance concretes that need to be colored or used in decorative applications.

EXAMPLE 1

A reference concrete was produced at a water/cement ratio of 0.45 and five additional concrete compositions were produced replacing cement with the CenterStar additive at two replacement levels, Type F fly ash, ground granulated blast furnace slag, or silica fume. The w/c level remained at 0.45. The mixtures are shown in Table 1 along with the plastic properties. A commercially available polycarboxylate high range water reducer (Grace ADVA140m) at about 6-20 oz/cwt was used to provide workability and a commercially available air entrain agent (Grace Daravair 1000) at about 4.4%-6.4% was used to provide air typical of that added to concretes exposed to freezing and thawing. The CenterStar mixtures display similar properties to the other mixtures demonstrating that they could be used in commercial production.

TABLE 1

Mixture Designs and Properties

| Mix | Cement (pcy) | CS (pcy) | TypeF FlyAsh (pcy) | SF (pcy) | GGBS (pcy) | CA (pcy) | FA (pcy) | Air (%) | Unit Wt. (pcf) | Yield (pcf) | Init. Set (h) | Final Set (h) |
|---|---|---|---|---|---|---|---|---|---|---|---|---|
| 1. Control | 667 | | | | | 1748 | 1167 | 6 | 143.7 | 26.67 | 4.53 | 5.84 |
| 2. 4% CS | 634 | 26.1 | | | | 1731 | 1149 | 6.1 | 142.1 | 26.9 | 5.15 | 6.56 |
| 3. 8% CS | 615 | 53.8 | | | | 1752 | 1155 | 4.4 | 143.5 | 26.58 | 5.64 | 7.08 |
| 4. 25% FA | 497 | | 165 | | | 1735 | 1117 | 6.1 | 141.1 | 26.85 | 4.71 | 6.13 |
| 5. 8% SF | 600 | | | 52.6 | | 1710 | 1138 | 6.4 | 140.5 | 27.23 | 4.2 | 5.41 |
| 6. 40% GGBS | 404 | | | | 269 | 1765 | 1081 | 6 | 141.5 | 26.39 | 4.65 | 6.35 |

Notes:
Nominal cementitious is 658 pcy, numbers reflect yield. ASTM C 494 Type F&G HRWR and ASTM C260 AEA admixtures were used for workability and air entrainment.

EXAMPLE 2

Table 2 provides the ASTM C39 strength data as a function of time. The CenterStar mixtures at both cement replacements had higher one day strengths than the other mixtures. The 4% replacement mixture was equivalent to or better than the other mixtures from 7 to 90 days. The 8% replacement was significantly better than all the mixtures, including silica fume at the same replacement level.

TABLE 2

Compressive Strength (psi) vs Time (days)

| Mixes | 1 | 7 | 28 | 90 |
|---|---|---|---|---|
| Control | 2790 | 4330 | 5075 | 5900 |
| 4% CS | 3015 | 4895 | 5855 | 6725 |
| 8% CS | 3400 | 5370 | 6625 | 7970 |
| 25% FA | 1910 | 3515 | 4780 | 6025 |
| 8% SF | 2625 | 4895 | 5985 | 7060 |
| 40% GGBFS | 1660 | 4615 | 5735 | 6565 |

EXAMPLE 3

Permeability reductions over time are shown in Table 3. Note that lower Coulomb values indicate a lower permeability and reduced rate of the ingress of chlorides. This is associated with better durability in deicing salt and marine environments. Initial ASTM C 1202 (Rapid chloride permeability) tests data show similar behavior to fly ash (much higher dosage of fly ash), but not as low as silica fume or slag. Over time performance improved similarly to fly ash, and surpassed that of slag at the higher CenterStar addition. Levels were approaching silica fume which essentially stopped becoming less permeable at 56 days.

TABLE 3

ASTM C 1202 Coulombs vs Time (days)

| Mix | 28 | 56 | 90 |
|---|---|---|---|
| Control | 2398 | 2357 | 1785 |
| 4% CS | 1820 | 1362 | 1083 |
| 8% CS | 1395 | 819 | 610 |
| 25% FA | 1429 | 912 | 586 |
| 8% SF | 641 | 505 | 507 |
| 40% GGBFS | 1053 | 895 | 812 |

These data show that the CenterStar additive provides improved strength at all times and enhanced reduction in permeability over time. Cement replacement rates are 3 to 10 times lower than that of fly ash or ground granulated blast furnace slag making this a very efficient material on the order of silica fume.

EXAMPLE 4

CenterStar additive in this example was added to increase the cementitious content over a cement only mixture, and sand was replaced to keep the volumes equal. Table 4 provides the mixture proportions for the reference mix with Portland cement and the Portland cement plus CenterStar additive, at 12.3% of the cementitious content. The workability was reduced somewhat, so a naphthalene sulfonated high range water reducer (BASF, Rheobuild 1000) at 25 oz/cwt was added to achieve equivalent workability for the CenterStar concrete.

TABLE 4

Concrete Mixture Proportions

| MIX | Cement (pcy) | CenterStar (pcy) | Sand (pcy) | Coarse Agg. (pcy) | Water (pcy) | HRWR* (oz/cwt) | AEA** (oz/cwt) | Air (%) | Slump (in) |
|---|---|---|---|---|---|---|---|---|---|
| Reference | 621 | 0 | 1284 | 1753 | 260 | 0 | 1.2 | 5.6 | 3.25 |
| CenterStar | 600 | 84 | 1167 | 1695 | 257 | 25 | 1.25 | 4.5 | 6.25 |

Notes:
Corrected for actual yield.
*On Portland cement and CenterStar-Rheobuild 1000
**On Portland cement and CenterStar--MB AE 90

EXAMPLE 5

Compressive strength data for the formulations in the preceding example are given in Table 5. At early times, unlike a fly ash or slag mixture, strengths are equivalent to the control. At 28 days there is a significant increase in strength with the CenterStar additive. If the material were inert then it would have been expected to behave in a similar manner to the sand that it replaced. However, the increase in strength indicates that it is behaving like a pozzolan and that the effective water/cement ratio dropped from 0.43 to 0.38. This would account for some of the need for additional super plasticizer.

TABLE 5

| | Compressive strength (psi) vs Time (days) | | | |
|---|---|---|---|---|
| MIX | 1 Day | 3 Days | 7 Days | 28 Days |
| Reference | 2645 | 3935 | 4420 | 5300 |
| CenterStar | 2440 | 4025 | 4725 | 6125 |

EXAMPLE 6

Another concrete mix was formulated with 1000 pounds of cement, 324 pounds of fly ash, 270 pounds of silica fume, 1647 pounds of sand, and 87 pounds of ground expanded perlite (the same form as was used in the previous examples). This was mixed with 432 pounds of water (51 gallons) and up to 210 ounces of ADVA 140 (W. R. Grace) super plasticizer to provide concrete of 3773 pounds/cubic yard. Water/cement ratio was 0.27. Weight per cubic foot of fresh concrete was 139 pounds (3861 pounds/cubic yard). This batch had a compressive strength of 4220 psi (5 days), 4720 psi (7 days), and 6770 psi (28 days). A 2 inch tall slice of a 4×8 inch cylinder was placed in an 1800° F. forge with no spalling observed.

EXAMPLE 7

Another concrete mix was formulated with 1000 pounds of cement, 250 pounds of fly ash, 54 gallons of water, 1772 pounds of coarse aggregate, 357 pounds of fine aggregate (sand), 87 pounds of ground expanded perlite, and 238 ounces of ADVA 140 super plasticizer. This mix had 1% air entrainment, a slump of 10 inches, density of 141.8 pounds/cubic foot (3847 pounds/cubic yard). Compressive strength by ASTM C39 was 7430 psi (7 days) and 10660 psi (28 days). Flexural strength by ASTM C78 was 1225 psi.

Samples of this mix were poured into 8 inch thick×24 inch diameter cylindrical molds for testing under simulated jet exhaust applied at Mach 1. [Details of the test facility and methods are described in Technical Report TR-2065-SHR, Development and Analysis of the Naval Facilities Engineering Service Center Aviation Engine Simulation Facility, by E. E. Cooper (1996).] The inventive material passed the test and to Applicants' knowledge only one other material also passed the test; the other material, however, is prohibitively expensive (~$2700/cu yd or about ten times the cost of the inventive material).

EXAMPLE 8

Another concrete mix was formulated with 770 pounds of cement, 193 pounds of fly ash, 37 gallons of water, 853 pounds of fine aggregate, 1685 pounds of coarse aggregate #1 (SG=2.7), 87 pounds of coarse aggregate #2 (SG 2.36), 48.2 ounces WRDA 64 additive (W. R. Grace), and 77 ounces ADVA 170 additive (W. R. Grace). Slump was 6 inches and air content was 4%. Water/cement ratio was 0.32. Fresh density of the concrete was 144.3 pounds/cubic foot (3896 pounds/cubic yard).

Two samples were cast in 4 inch diameter×8 inch long cylinders. A third specimen was a rectangular plate. All three specimens were heated on one edge of the finished side using a propane torch (approximately 1800° C. flame temperature) and on the opposite edge using a MAPP gas torch (approximately 5300° C. flame temperature). The areas were heated for 2 minutes at a distance of about 2 inches from the tips of the torches. All three specimens produced a slight red glow when heated with the propane, and a more intense glow when heated with the MAPP gas. No violent pop outs or spalling were observed in the test specimens, in contrast to the behavior expected from a typical concrete sample.

Those skilled in the art of concrete will appreciate that the optimal composition of the mix will vary depending on the particular application. For example, the amount of ground expanded perlite replacing the cement may vary from 2% to 25%, preferably from 2 to 15%, and more preferably from 4 to 15%. For a standard 5000 psi concrete, the preferred amount of ground expanded perlite will range from about 25 to 100 pounds per cubic yard. In general, for many applications, the amount of cement plus perlite will be about 13 to 18 percent by weight of the total mix.

For adequate strength in structural applications such as airport runways, a suitable coarse aggregate is needed. Some examples of suitable aggregate materials include gravel, limestone, and crushed granite. The coarse aggregate preferably has a size range from ⅜ to ¾ inch and preferably comprises about 30 to 45% by volume of the fresh concrete mix. The fine aggregate is preferably sand, but may contain other materials such as coal ash, slag, etc. as are known in the art.

The fine aggregate preferably comprises 25 to 30% by volume of the fresh concrete mix.

The inventive concrete mixtures may have a range of fresh density, based on familiar variables such as the water/cement ratio, the nature and amount of coarse and fine aggregate, etc. In general, the fresh density is preferably in the range from about 135 to 145 pounds/cubic foot, or 3645 to 3915 pounds/cubic yard.

The water/cement ratio can be varied over some range, as is known in the art, with the understanding that as the water/cement ratio decreases, there may be a need to add various conventional additives to improve workability or other properties. Some of these additives and their functions are the following: W R Grace AdvaFlow 140M to increase workability and W R Grace Daravair 1000 to increase durability. In general, for the inventive mixtures, Applicants prefer a water/cement ratio in the range of about 0.3 to 0.5 by weight. Those skilled in the art will appreciate that the water to cement ratio must take into account the amount of both Portland cement and perlite and any other supplementary cementitious material such as fly ash, silica fume, ground granulated blast furnace slag, and metakaolin.

The foregoing examples show a number of surprising and useful properties of the inventive material compared to previously available materials, including previous materials that contain perlite in various forms:

Using a standard 5000 psi mix design, the inventive additive consistently produces concrete with more than twice the compressive strength of regular concrete. In addition, the flexural strength of the same material averages 60% more than a comparable conventional 5000 psi concrete.

The combination of high early strength and reduced permeability are desirable properties, which are not obtained with fly ash or slag (which exhibit low early strengths) or with silica fume (permeability reduction tends to level off).

Compared to perlite-containing grouts and wellbore fluids, the inventive materials contain coarse aggregate, which allows them to be used for structural applications. The inventive material is significantly stronger than low-density thermally insulating concrete, while markedly more spall resistant than conventional structural concrete.

It will be understood that expanded perlite in the desired particle size range (typically characterized by a volume weighted mean particle size of approximately 10-100 μm) may be obtained by grinding expanded perlite to obtain the distribution or by separating the selected particle distribution from a larger sample of expanded perlite using any convenient size classification method.

EXAMPLE 9

The high surface area and absorption characteristics of the expanded perlite (EP) increases the potential water demand in the production of concrete, mortars, and cementitious pastes. Table 6 shows the additional amounts of high range water reducer or superplasticizer needed to get equivalent workability compared to conventional concrete mixes and those using alternative supplementary cementitious materials (SCM's). The higher superplasticizer levels increase the cost of the concrete and can increase retardation, offsetting some of the early age improvements.

TABLE 6

Mixture designs with EP and other additives

| Batch[a] | 1 | 2 | 3 | 4 | 5 | 6 |
|---|---|---|---|---|---|---|
| Mix | | | | | | |
| Cement, lb/yd$^3$ | 658 | 632 | 605 | 494 | 605 | 395 |
| EP | | 26 | 53 | | | |
| Fly ash | | | | 164 | | |
| Silica fume | | | | | 53 | |
| Slag | | | | | | 263 |
| Fine aggregate, lb/yd$^3$ | 1152 | 1145 | 1137 | 1111 | 1148 | 1057 |
| Coarse aggregate, lb/yd$^3$ | 1725 | 1725 | 1725 | 1725 | 1725 | 1725 |
| Volume of coarse aggregate | 10.35 | 10.35 | 10.35 | 10.35 | 10.35 | 10.35 |
| Sand/aggregate volume ratio | 0.4 | 0.4 | 0.4 | 0.39 | 0.4 | 0.4 |
| Total water, lb/yd$^3$ | 295 | 295 | 295 | 295 | 295 | 295 |
| Water/cementitious ratio | 0.45 | 0.45 | 0.45 | 0.45 | 0.45 | 0.45 |
| Admixtures | | | | | | |
| Air entraining agent[b] oz/cwt | 0.8 | 2.2 | 2.8 | 1 | 1 | 1 |
| Superplasticizer[c] oz/cwt | 6 | 14 | 20 | 2.8 | 5 | 3.5 |
| Properties | | | | | | |
| Temperature, ° F. | 69 | 67 | 67 | 69 | 69 | 69 |
| Slump, inches | 6.5 | 8 | 7.75 | 7.5 | 5 | 7.5 |
| Density, lb/ft$^3$ | 143.7 | 142.1 | 143.5 | 141.1 | 140.5 | 141.5 |
| Actual yield, ft$^3$ | 26.65 | 26.9 | 26.58 | 26.85 | 27.23 | 26.39 |
| Initial set time, h | 4.54 | 5.15 | 5.64 | 4.74 | 4.21 | 4.65 |
| Final set time, h | 5.82 | 6.56 | 7.08 | 6.16 | 5.42 | 6.35 |

[a]Batch 1: control; Batch 2: EP replacing 4% of cement; Batch 3: EP replacing 8% of cement; Batch 4: Class F fly ash replacing 25% of cement; Batch 5: Silica fume replacing 8% of cement; Batch 6: Ground slag replacing 40% of cement
[b]Grace Daravair 1000
[c]Grace ADVA 140

EXAMPLE 10

Noticing the improvement of fly ash on workability, an experiment was conducted to use a high fly ash content to reduce water demand with the expanded perlite. A mix using 4% EP replacement of cement and with 40% replacement of cement by Class F fly ash was compared to the control (no EP and no fly ash) and to a batch with fly ash but no EP. This approach was not completely successful; the amount of air entrainment agent was similar (1.2-1.5 oz/cwt) but the necessary superplasticizer dosage was still significantly higher (5 oz/cwt vs none in the control). The higher dosages of superplasticizer increased setting times beyond that of the controls and other supplementary cementitious materials (fly ash, silica fume, or slag). This is not a desirable result.

Applicants realized that the extra water is needed because the large internal surface area of the EP causes the particles to absorb water from the mix. A series of experiments were then conducted to explore ways of adding water to the EP mix in ways that avoid the effects of simply adding more water to the mix during batch formation

EXAMPLE 11

Experiments were conducted to determine the water demand of the expanded perlite and Applicants discovered, surprisingly, that EP with a 1:1 addition of water (by weight) still behaves as a flowable powder. So an additional group of tests were conducted to determine if adding extra water would improve workability without an adverse effect on other properties. The water was added to the normal water, sand and coarse aggregates, plus expanded perlite and mixed in before the cement and fly ash were added. This allowed the expanded perlite to absorb the water. Table 7 shows that workability was achieved without additional superplasticizer even at a higher addition level of the expanded perlite.

TABLE 7

Effects of adding water to mix with expanded perlite

|  | 40% Fly Ash Replacement | 40% Fly Ash Replacement and 6% EP replacement* |
|---|---|---|
| Lafarge Alpena Type I lb/yd3 Nov. 7, 2012 | 395 | 356 |
| Thermopel lbs/yd3 |  | 39 |
| Class F Ash Headwaters DTE Monroe MI Jul. 26, 2012 | 263 | 263 |
| Expanded Perlite lb/yd3 |  | 39 |
| Water Addition (No Volume) lb/yd3 |  | 39 |
| Fine Byholt 4th St. Pit SSD lb/yd3 | 1252 | 1241 |
| C.A. Bay Agg. Cedarville LS SSD lb/yd3 | 1725 | 1725 |
| Water | 260 | 260 |
| ADMIXTURES |  |  |
| Grace Daravair M Oz/cwt (AEA) | 1.5 | 1.4 |
| Grace Adva 408 (Super) oz/cwt |  | 0 |
| Act W/CM | 0.4 | 0.4 |
| lSlump in. | 7 | 5.25 |
| Air Content % | 5.7 | 4.7 |

*Added water equal to mass of expanded perlite to reduce water demand

EXAMPLE 12

An alternative approach to reduce short-term water demand in mixing was to mix a hydrophobic material, Hycrete W1000, (Hycrete, Inc., Carlstadt, N.J.) with additional water into the expanded perlite and then evaporate the additional water used in the mixing process. The Hycrete was added at 20% by total weight solids plus water to the expanded perlite and additional water at 74% by mass of expanded perlite was used to have a uniform mixing. The material was dried at 110° C. to evaporate the water so that the hydrophobic compound was effectively applied to at least part of the accessible surface area of the expanded perlite. Table 8 shows the effects of workability of this approach. A higher expanded perlite concentration than was used in Example 10 was possible with a moderate level of superplasticizer.

It will be appreciated that the invention is not limited to this particular hydrophobic material. Through routine experimentation, the skilled artisan can adapt many other known hydrophobic materials such as salts of fatty acids (e.g. butyl oleate or butyl stearate), fatty acids, (e.g., oleic acid, steric acid), metal salts of dioic acids, and silanes and siloxanes, and these would be expected to perform in a substantially similar way. It will be further appreciated that the mixture of water and hydrophobic material may be a solution, a suspension or emulsion, or some combination depending on the particular solubility characteristics of the compound(s) being used. Furthermore, the starting hydrophobic material may contain solvents or thinning agents such as isopropanol or similar materials.

TABLE 8

Effects of adding hydrophobic expanded perlite

|  | 40% Fly Ash Replacement | 40% Fly Ash Replacement and 6% EP replacement* |
|---|---|---|
| Lafarge Alpena Type I lb/yd3 Nov. 7, 2012 | 395 | 356 |
| Thermopel lbs/yd3 |  | 39 |
| Class F Ash Headwaters DTE Monroe MI Jul. 26, 2012 | 263 | 263 |
| Expanded Perlite lb/yd3 |  | 39 |
| Water Addition (No Volume) lb/yd3 |  |  |
| Fine Byholt 4th St. Pit SSD lb/yd3 | 1252 | 1241 |
| C.A. Bay Agg. Cedarville L.S SSD lb/yd3 | 1725 | 1725 |
| Water | 260 | 260 |
| ADMIXTURES |  |  |
| Grace Daravair M Oz/cwt (AEA) | 1.5 | 0.5 |
| Grace Adva 408 (Super) oz/cwt |  | 5 |
| Act W/CM | 0.4 | 0.5 |
| lSlump in. | 7 | 3.00 |
| Air Content % | 5.7 | 6.6 |

*Hydrophobic agent premixed into expanded perlite and dried

Table 9 shows the strength and resistivity of the mixes in Examples 11 and 12. There isn't a large strength or resistivity increase with the addition of the expanded perlite to mixtures with high levels of fly ash replacement. Thus, in this case we are determining if the improvements in workability, better air management, and lower setting times have a severe adverse effect on strength and resistivity where higher values represent better performance.

TABLE 9

Strength and resistivity

| | Mixes | | | | |
|---|---|---|---|---|---|
| | 1-Control | 2-FA-40 | 3-FA-40T4 | 40% FlyAsh 6% EP water | 40% FlyAsh 6% EP Hydrophobic |
| Compressive Strength (psi) | | | | | |
| 1 day | 1900 | 1395 | 1110 | 880 | 835 |
| 3 days | 3120 | 2460 | 2165 | | |
| 7 days | 3695 | 3470 | 2955 | 2750 | 2510 |
| 14 days | 4210 | 4240 | 3700 | 3455 | 3320 |
| 28 days | 4640 | 5290 | 4590 | 4575 | 4025 |
| Resistivity ($\Omega \cdot cm$) | | | | | |
| 7 days | | | | 3005 | 3720 |
| 14 days | 3955 | 4100 | 3615 | 4005 | 5800 |
| 28 days | 6405 | 12875 | 11625 | 8610 | 11205 |

Note all but control mix have 40% fly ash. 3-FA is 4% EP. Water and hydrophobic mixes have 6% EP.

The results show lower values at early times with extra water or a hydrophobic component, but improvements in time are high. The results indicate that minor modifications could correct this, and in the absence of the high replacement of cement with fly ash, the performance should be better as noted in the work without combinations of fly ash and expanded perlite. A possible explanation for the behavior is that the high quantity of fly ash is competing for the calcium hydroxide produced by the hydrating cement and thus limiting the reaction of the expanded perlite.

EXAMPLE 13

In lieu of adding additional water to a concrete mixture, tests were run to determine if water or water plus a superplasticizer could be added to expanded perlite while still allowing the EP to be handled as a flowable powder. Table 10 shows data for experiments where water or water plus a superplasticizer were added to expanded perlite. It was noted that the powders were partially consolidated after mixing, which has the surprising benefit of reducing the formation of airborne particulates during handling of dry EP at this particle size distribution. Applicants prefer the EP to have a moisture content in the range of about 10-50% by weight, and more preferably 25-50% by weight (i.e., 25-50% of the total mass is water in this example).

TABLE 10

Mixes of EP containing water with or without superplasticizer
Mix proportions

| | Thermopel (g) | Water (g) | Adva 195 (g) |
|---|---|---|---|
| #1 | 40 | 20 | 0 |
| #2 | 40 | 6.8 | 13.2 |
| #3 | 40 | 40 | 0 |
| #4 | 40 | 26.8 | 13.2 |
| #5 | 40 | 0 | 0 |

Note that Thermopel ™ is the commercial name for CenterStar's EP product.

Figure 2:
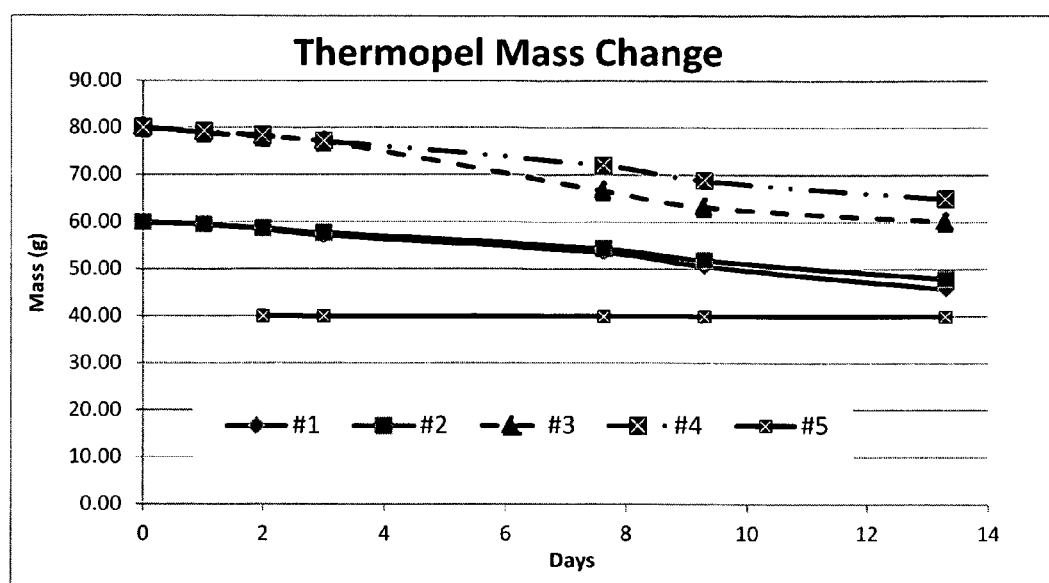
FIG. 2 is a plot of weight loss over time for Thermopel (EP) with added water or water plus superplasticizer at 0.5:1 and 1:1 Liquid by mass to Thermopel. The bottom line shows no mass change for Thermopel alone.

The materials were not tightly sealed and mass loss was determined. Under such conditions, some weight loss occurred, but at a decreasing rate as seen in FIG. 2. In tightly packed bags moisture loss would be considerably less so this is a viable means of adding extra water. It will be appreciated that the added weight of the absorbed water would not significantly increase transportation costs, because the "wet" material is still fairly lightweight and shipping costs for such materials are based on volume and not weight. The combinations with superplasticizer had a lower percentage loss of water. This will improve stability in storage as well as improving workability. The percentage losses of added water are shown in Table 11. Applicants prefer to use a superplasticizer in an amount equal to about 0.025% to 0.8% (solids basis), dependent upon the superplasticizer used and desired workability.

TABLE 11

Loss of water via open evaporation of "wet" EP

| | Net change (g) | % loss of original liquid |
|---|---|---|
| #1 | 12.06 | 71.05 |
| #2 | 19.91 | 60.3 |
| #3 | 15.1 | 49.775 |
| #4 | 0.06 | 37.75 |
| #5 | 0 | 0 |

Note #5 is Thermopel (EP) alone

Suitable superplasticizers may include polycarboxylates, naphthalene sulfonate, and melamine sulfonate as are well known in the art.

It will be appreciated that various packaging strategies may be used to minimize water loss during shipping and storage. For example, the material may be packed in a pulpable bag with or without plastic wrap around the pallet or with bags that dissolve at pH above 11 to prevent moisture lost. Alternatively, somewhat more water could be added to the EP prior to shipping to allow for some evaporative loss.

Applicants have further determined that expanded perlite can be premixed with a larger amount of water to form a flowable slurry. The minimum amount of water needed is approximately 5 to 6 parts to one part EP by mass. The slurry can be produced at the concrete plant before mixing with the other concrete ingredients. This eliminates the absorption of water by the EP during the concrete mixing and reduces dust. The water would count as mixing water for the calculation of water-to-cementitious ratio.

We claim:

1. A concrete additive comprising:
  a flowable powder comprising ground expanded perlite with a volume weighted mean particle size of approximately 10-100 µm and a moisture content of 10 to 50% by weight.

2. The concrete additive of claim 1 wherein said moisture content is 25 to 50% by weight.

3. The concrete additive of claim 1 wherein said ground expanded perlite has 100% of the particles less than 200 µm, 90% below 80 µm, and a volume weighted mean of approximately 38 µm.

4. The concrete additive of claim 1 further comprising a superplasticizer in an amount equal to about 0.025 to 0.8% on a solids basis.

5. The concrete additive of claim 4 wherein said superplasticizer is selected from the group consisting of: polycarboxylates, naphthalene sulfonate, and melamine sulfonate.

6. A concrete additive comprising:
a flowable powder comprising ground expanded perlite with a volume weighted mean particle size of approximately 10-100 μm, and,
a hydrophobic compound applied to at least part of the accessible surface area of said expanded perlite.

7. The concrete additive of claim 6 wherein said hydrophobic compound is selected from the group consisting of: salts of fatty acids, fatty acids, metal salts of dioic acids, silanes, and siloxanes.

8. The concrete additive of claim 6 wherein said ground expanded perlite has 100% of the particles less than 200 μm, 90% below 80 μm, and a volume weighted mean of approximately 38 μm.

9. The concrete additive of claim 6 wherein said hydrophobic compound is applied to said surface area by mixing said ground expanded perlite with an aqueous mixture of said hydrophobic compound and evaporating excess water.

10. A concrete additive comprising:
a flowable powder comprising ground expanded perlite with a volume weighted mean particle size of approximately 10-100 μm, and,
at least one additional component selected from the group consisting of:
water in an amount of 10 to 50% by weight;
superplasticizer in an amount of about 0.025 to 0.8% on a solids basis; and,
a hydrophobic compound applied to at least part of the accessible surface area of said ground expanded perlite.

11. The concrete additive of claim 10 wherein said ground expanded perlite has 100% of the particles less than 200 μm, 90% below 80 μm, and a volume weighted mean of approximately 38 μm.

12. A concrete additive comprising:
a flowable slurry comprising ground expanded perlite with a volume weighted mean particle size of approximately 10-100 μm and a water content of at least five times that of said perlite by weight.

* * * * *